March 6, 1951 — W. H. CLARK — 2,544,134
LIQUID PULSATOR SYSTEM WITH PRESSURE COMPENSATION
Filed Sept. 16, 1943 — 2 Sheets-Sheet 1
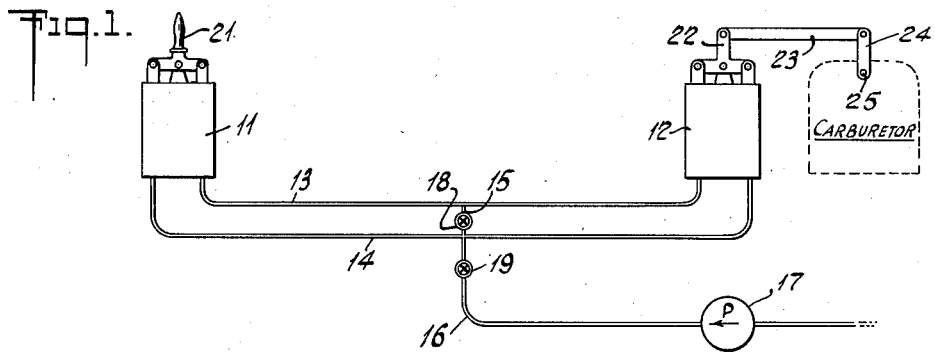
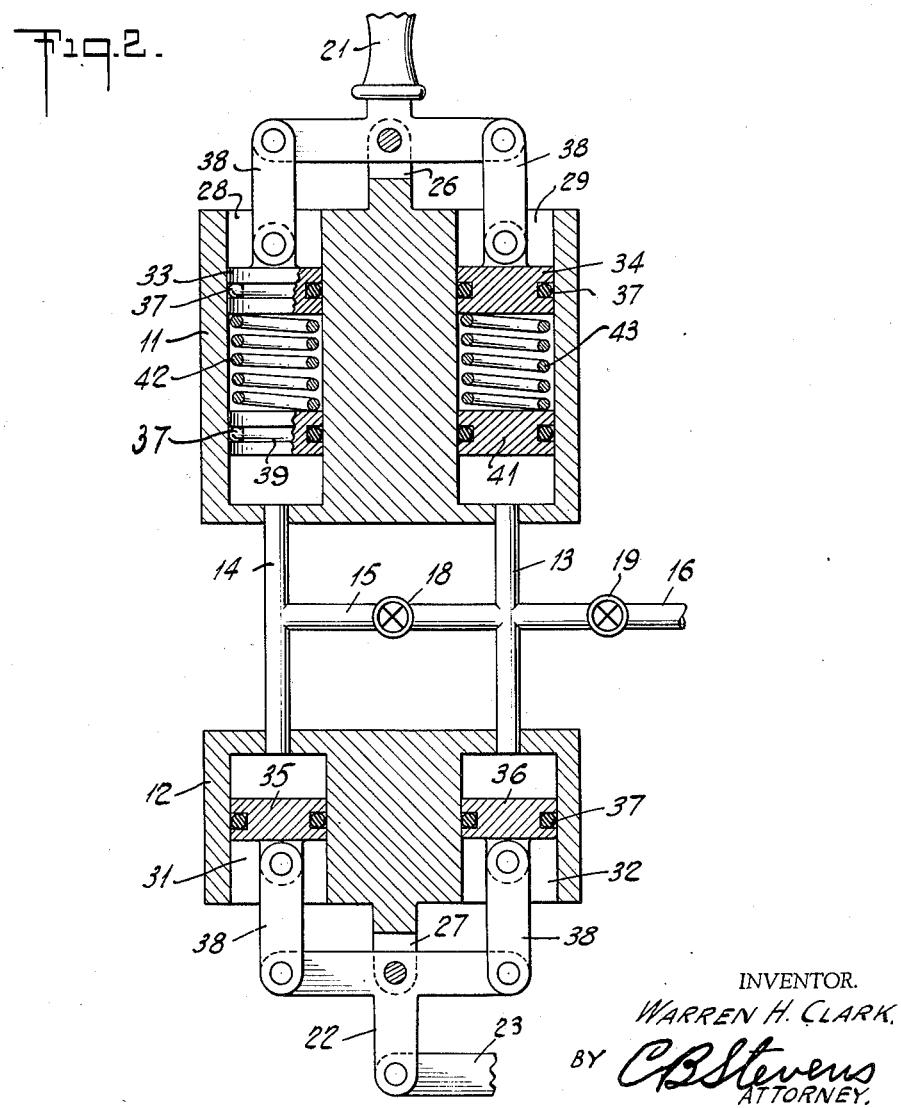
INVENTOR.
WARREN H. CLARK.
BY C. B. Stevens
ATTORNEY.

March 6, 1951     W. H. CLARK     2,544,134
LIQUID PULSATOR SYSTEM WITH PRESSURE COMPENSATION
Filed Sept. 16, 1943     2 Sheets-Sheet 2
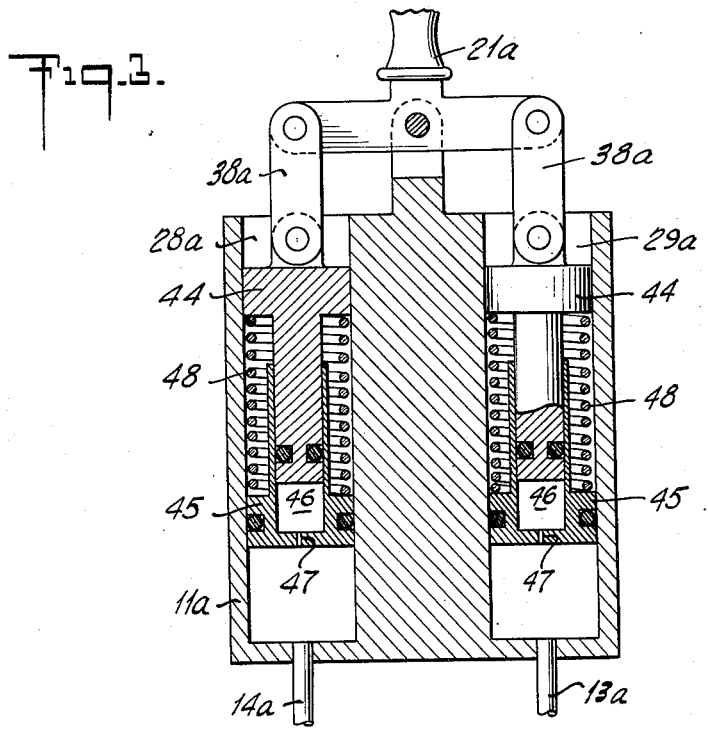
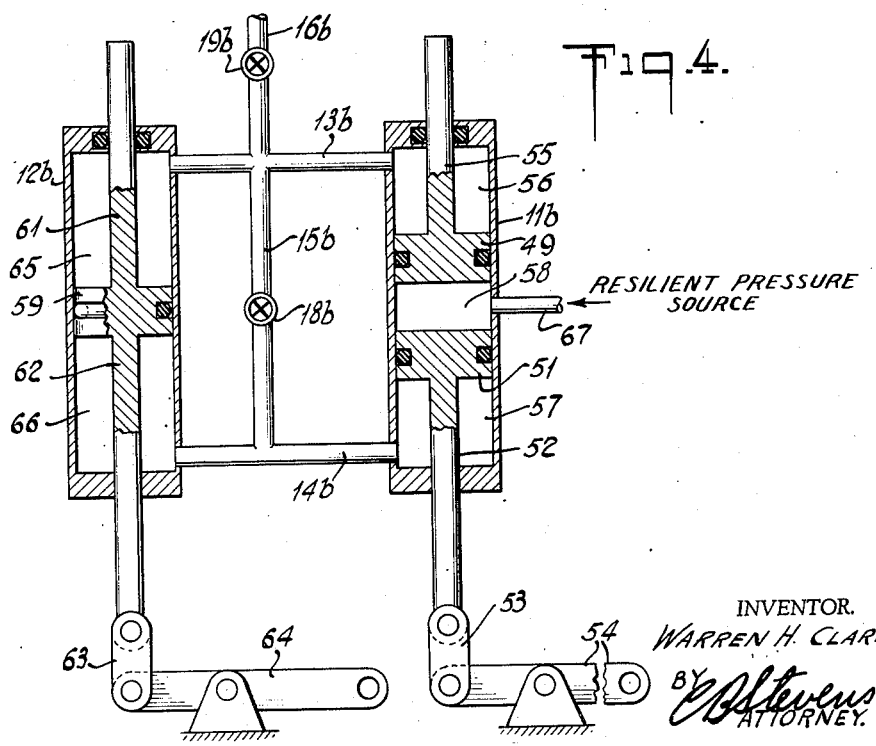
INVENTOR.
WARREN H. CLARK.

Patented Mar. 6, 1951

2,544,134

UNITED STATES PATENT OFFICE 2,544,134

LIQUID PULSATOR SYSTEM WITH PRESSURE COMPENSATION

Warren H. Clark, Glendale, Calif., assignor to United Aircraft Products, Inc., Dayton, Ohio, a corporation of Ohio Application September 16, 1943, Serial No. 502,621

6 Claims. (Cl. 60—54.5)

This invention relates to hydraulic remote control devices and more particularly to apparatus utilizing parallel hydraulic columns for the transmission of pressure impulses.

The device of the invention has special application to aircraft and may advantageously be used in the remote control of throttles, mixture adjustments, trim tabs, steering mechanism, manifold controls and other automatic or pilot operated mechanisms.

Among the objects of the invention are to provide a ready means of synchronizing the pressures of the separate hydraulic columns; to obtain automatic compensation for pressure variations brought about by leakage and temperature changes, and in general to provide a simple, sturdy control apparatus troublefree in its operation and accurate and sensitive in its response.

Other objects and structural details of the invention will be apparent from the following description when read in conjunction with the accompanying drawings, wherein:

Fig. 1 is a view of remote control apparatus constructed in accordance with the present invention and illustrated as operating in a typical installation;

Fig. 2 is a diagrammatic view of the remote control apparatus of this invention, showing one of the forms it may assume;

Fig. 3 is a diagrammatic view, indicating a second structural form the invention may assume; and Fig. 4 is a diagrammatic view of a third embodiment of the invention.

In reducing the invention to terms of structure, there is produced a system such as that illustrated in Fig. 1, wherein a hydraulic remote control system is shown embodying the present invention as it may be used to operate the throttle of an aircraft engine.

According to that construction and arrangement of parts apparatus is provided including a transmitting unit 11, a receiving unit 12 and interconnecting liquid conduits 13 and 14. The conduits 13 and 14 are adapted to communicate with each other through a line 15 and with a source of fluid pressure such as pump 17 through a line 16. Pump 17 may be engine driven and when in operation supplies liquid through the line 16 to the conduits 13 and 14 establishing therein hydraulic columns through which pressure impulses applied at the transmitting unit are imparted to the receiving unit. Interposed in the lines 15 and 16 are respective valves 18 and 19 settable to open and closed positions to cut off and establish communication between the conduits 13 and 14 and the pump 17. With both valves open pump pressure may be applied in both conduits. With the valve 19 closed and the valve 18 open the control system is cut off from the pump but an exchange of liquid between the conduits is permitted whereby the pressures therein tend to become equalized or balanced. With both valves 18 and 19 closed the liquid columns are confined in their respective conduits and operate as independent pressure transmitting agents.

The structure of the transmitting and receiving units includes respective levers 21 and 22 constituting the operating and operated means of the system. The levers 21 and 22 are similarly mounted for oscillating motion, the former being movable under the manual control of the operator and the latter being movable by hydraulic pressure applied through the interconnecting conduits 13 and 14. The transmitting unit is arranged for convenient manipulation by the operator, for example in the cockpit of the plane, while the receiving unit is mounted in the engine compartment. The lever 22 on the receiving unit is connected by suitable linkage, such as a link 23 and an arm 24, to a throttle shaft 25 projecting from the carburetor. Thus, operation of the lever 22 is accompanied by a rocking motion of the shaft 25 whereby adjustments are made in the position of the engine throttle.

Following broadly the principle of operation disclosed in Fig. 1, the transmitting and receiving means of the control system may assume a variety of forms, some of which are shown here. Referring to the diagrammatic view, Fig. 2, in accordance with one structural conception of the invention the levers 21 and 22 are constructed as three armed bell-cranks pivotally mounted at their mid-points on similar projections 26 and 27 at the end of the transmitter and receiver respectively. Each lever is formed with a pair of oppositely extending horizontal arms and with a vertical arm, the latter being in the case of the transmitter adapted for the grasp of the operator and in the case of the receiver adapted for connection with the apparatus controlled, as with the link 23 and associated parts. The horizontal arms of the lever 21 overlie longitudinal bores 28 and 29 in the transmitter 11. The ends of the bores 28 and 29 adjacent the lever 21 are open while the opposite ends thereof are closed. The receiver 12 embodies a similar construction, having longitudinal bores 31 and 32 opening adjacent the horizontal arms of the lever 22. The closed ends of the bores in the transmitter and receiver are connected by the conduits 13 and 14. Bore 28 in the transmitter and bore 31 in the receiver communicate with each other by way of the conduit 14, while the conduit 13 establishes communication between transmitter bore 29 and receiver bore 32.

Within the transmitter bores 28 and 29 are respective pistons 33 and 34, and within the receiver bores 31 and 32 are respective pistons 35 and 36. All the pistons are similarly formed and have a sliding fit in their several bores. The separate pairs of pistons 33—34 and 35—36 are connected to the respective levers 21 and 22 by means of links 38 each of which is pivotally attached at one end to a piston and connected in a like manner at its other end to a horizontal arm of its associated lever. The arrangement is such that a rocking motion of the transmitter lever 21 will cause one of the pair of pistons 33 and 34 to move inward or towards the closed end of its bore, and will cause the other piston of the pair to move outward or toward the open end of its bore. In a similar fashion motion of one of the pair of receiver pistons 35 and 36 in one direction effects a rocking motion of the lever 22 and movement of the other piston of the pair in the opposite direction. The transmitter pistons 33 and 34 are part of assemblies which further comprise pistons 39 and 41, in advance of the respective pistons 33 and 34, and compression springs 42 and 43, the former being confined between the pistons 33 and 39 and the latter being confined between the pistons 34 and 41. The commuicating areas between the pistons 39 and 41 and the pistons 35 and 36 are filled with a liquid, such as oil, whereby to establish separate hydraulic columns between the transmitter and receiver. The pistons 39 and 41 are freely movable within the bores 28 and 29 and operate through the hydraulic columns on one side thereof and through the springs 42 and 43 on the other side thereof to transmit motion between the pair of pistons 33 and 34 and the pair of pistons 35 and 36. The pistons preferably are provided with peripheral sealing rings 37, although in the case of pistons 33 and 34 such rings may be omitted since those pistons are not subject to hydraulic pressure.

In conditioning the control system for operation the pump 17 is set in motion and both valves 18 and 19 are opened. Liquid flows into the system through supply line 16 and connection line 15 and fills the conduits 13 and 14 and the communicating areas in the transmitting and receiving units. The supply of liquid is continued until the pressure exerted on the pistons 39 and 41 is greater than any pressure that is apt to be created in the system due to operating loads as represented by the manual pressure applied to lever 21. The liquid pressure acting through pistons 39 and 41 compresses springs 42 and 43 and when the desired pre-load has been imposed on the springs the supply valve 19 is closed. The levers 21 and 22 on the transmitter and receiver are adjusted until they are identical in position or in whatever relation is desired for the use of the device. The equalizing valve 18 then is closed and the system is ready to operate. When the lever 21 on the transmitter is moved to produce a required movement at the receiving unit one of the pair of pistons 33 and 34 is depressed and the other of the pair of pistons is raised. The piston being depressed acts on its associated spring 42 or 43 to effect movement of the piston 39 or 41, such movement being accomplished without relative movement between the pistons due to the state of precompression in which the springs have been set. Assuming that the piston 33 is the one depressed, that piston, the spring 42 and the piston 39 move as a unit downward in bore 28 and displace from the bore a volume of liquid proportionate to the extent of movement of lever 21. The displaced liquid passes through conduit 14 and acts on piston 35, causing a movement thereof in the same direction as the piston 33 and through an equal distance. The linkage, including lever 22 and links 38, connecting pistons 35 and 36 will cause piston 36 to move to the same extent as the piston 35 but in the opposite direction. The movement of pistons 36 will displace a volume of liquid equal to that displaced by piston 39, which liquid flows through conduit 13 to bore 29 of the transmitter and maintains pressure on the assembly comprising piston 41, spring 43 and piston 34 which moves equally and oppositely to the movement of the assembly in bore 28.

The springs 42 and 43 provide a means of compensating for leakage in the system and for temperature changes which cause the liquid to expand and contract. Thus if the pressure in either of the hydraulic columns interconnecting the transmitter and receiver should drop, due to leakage or to a decrease in temperature, the floating piston 39 or 41 is allowed a compensating movement under the urging of spring 42 or 43. Similarly, the springs 42 and 43 may yield under higher than normal pressures such as might result from a temperature increase. Should one side of the system become unbalanced with respect to the other side, synchronization can be re-established by opening equalizing valve 18.

Another practical arrangement of the transmitting unit is shown diagrammatically in Fig. 3. This unit is designed to operate at pressures lower than the pressure likely to be induced in the system by operation. According to this construction each bore 28a and 29a contains a piston assembly comprised of a pair of pistons 44 and 45 having rods arranged in telescoping relation so as to define therebetween a pressure chamber 46. Piston 45 which in this case is the floating piston corresponding to pistons 39 and 41 of the first embodiment, is formed with a restricted orifice 47 communicating the chamber 46 with the closed end of the bore and thereby with the hydraulic column. A spring 48 is interposed between each piston 44 and 45 and functions like the springs 42 and 43 to maintain a predetermined pressure in the system. The chamber 46 is adapted to be filled with fluid entering by way of orifice 47 and the liquid therein constitutes an operating connection between the pistons 44 and 45, which connection may yield in response to leakage or temperature variations in the system. In the modification of Fig. 3 a lower pre-load can be used without sacrificing the features of temperature and leakage compensation. Spring means as represented by the springs 48 is used to move the piston 45 but this movement is very slow since liquid must be taken into or displaced from chamber 46 to allow the piston 45 to move in relation to piston 44. Also a more efficient system results since packing friction is reduced.

A third embodiment of the invention is indicated diagrammatically in Fig. 4. According to this conception of the invention the transmitter unit 11b is constructed as a cylinder and contains opposed pistons 49 and 51, the latter having a rod 52 extending from one end of the transmitter and connected through a link 53 with a lever 54 constituting the operating means of the system. Piston 49 has a rod 55 extending through the opposite end of the transmitter to atmosphere. In conjunction with the ends of the transmitter the pistons 49 and 51 define end chambers 56 and 57 and an intermediate chamber 58 between the pistons. The receiving unit 12b is also constructed as a cylinder and contains a single piston 59 having oppositely extending rods 61 and 62, the latter of which is connected through a link 63 to a lever 64 constituting the operated means of the system. Within the receiver 12b on opposite sides of the piston 59 are chambers 65 and 66, the former communicating through conduit 13b with chamber 56 of the transmitter and the latter communicating through conduit 14b with transmitter chamber 57. Transmitter chamber 58 preferably is connected through conduit 67 with a source of resilient hydraulic pressure as from a spring type or compressed air type accumulator, which pressure replaces the springs of the previously considered embodiment as a means effecting relative movement between the pistons 49 and 51 to compensate for leakage and temperature changes. Alternatively such movement may be effected by a spring. Filling and synchronizing of the system is accomplished in the manner described in connection with the Fig. 2 form of the invention.

It will be evident that other modifications of the control system may be arrived at without departing from the spirit of the present invention. For example, it is possible to use different size pistons in the transmitting and receiving units to introduce a step up or step down relation between the units. Thus the movement at the transmitter could be adjusted to a convenient stroke when only fine increments of movement are desired at the receiver.

What is claimed is:

1. Hydraulic remote control apparatus comprising a transmitting device and a receiving device; a hydraulic column between said devices; piston means for applying pressure to said hydraulic column and for receiving pressure impulses transmitted through said column, said piston means including a piston assembly comprised of a pair of axially spaced relatively movable pistons, and a compression spring confined between said pistons; and means for placing said hydraulic column at an initial pressure to obtain a predetermined state of compression in said spring inhibiting relative motion between said pistons during normal operation of said piston assembly.

2. Hydraulic remote control apparatus, comprising a transmitting device and a receiving device; a pair of hydraulic columns between said devices; piston means in said devices at the opposite ends of said columns for applying pressure to said hydraulic columns and for receiving pressure impulses transmitted therethrough, said piston means including a first pair of pistons in said transmitting device acting directly on respective hydraulic columns, a second pair of pistons axially spaced from and relatively movable with respect to said first pair of pistons, and compression spring means between said pairs of pistons; operating means connecting said second pair of pistons and acting to regulate the movement thereof under the pressure of said springs; and means for placing said hydraulic columns at initial pressures placing said springs under predetermined degrees of compression inhibiting relative motion between said pistons during normal operation of said piston means.

3. Hydraulic remote control apparatus according to claim 2 characterized by means for equalizing the pressures of said hydraulic columns.

4. Hydraulic remote control apparatus, comprising a transmitting device and a receiving device; a hydraulic column between said devices for the transmsision of motion; piston means in said devices for applying pressure to said hydraulic column and for receiving pressure impulses transmitted therethrough, said piston means including a pair of axially spaced pistons, stems on said pistons in telescoping relation to define therebetween a pressure chamber, a restricted opening in one of said pistons communicating said pressure chamber with said hydraulic column, and spring means between said pistons; and means for applying an initial pressure to said hydraulic column sufficient to place said spring means under compression.

5. Hydraulic remote control apparatus, comprising a transmitting device and a receiving device; a hydraulic column between said devices for the transmission of motion; piston means in said devices for applying pressure to said hydraulic column and for receiving pressure impulses transmitted therethrough, said piston means including a pair of axially spaced pistons, means defining a pressure chamber between said pistons, a restricted opening in one of said pistons communicating said pressure chamber with said hydraulic column and spring means between said pistons; and means for applying an initial pressure to said hydraulic column sufficient to place said spring means under compression.

6. Hydraulic remote control apparatus, comprising transmitting means and receiving means, piston chambers in each of said transmitting and receiving means, piston means in said chambers, separate conduits connecting the chambers of said transmitting means to the respective chambers of said receiving means, liquid in said conduits forming hydraulic columns for the transmission of motion of one piston to another, means for establishing and discontinuing communication between said conduits, resilient pressure producing means acting upon said piston means in said transmitting means to maintain a pressure on said hydraulic columns whereby to compensate for volume changes therein induced by temperature or by leakage, a source of liquid under pressure, and means for establishing and discontinuing communication between said conduits and said source of pressure liquid whereby said hydraulic columns may be placed under a predetermined pressure and an initial pressure imparted through said pistons to said resilient pressure producing means.

WARREN H. CLARK.

REFERENCES CITED

The following references are of record in the file of this patent:

UNITED STATES PATENTS

| Number | Name | Date |
|---|---|---|
| 616,756 | Williamson | Dec. 27, 1898 |
| 625,352 | Paidassy | May 23, 1899 |
| 949,559 | Wilson | Feb. 15, 1910 |
| 1,606,224 | Hoeller | Nov. 9, 1926 |
| 1,633,463 | Sperry | June 21, 1927 |
| 2,092,721 | Arter | Sept. 7, 1937 |
| 2,205,046 | Nardone | June 18, 1940 |
| 2,286,452 | Worth | June 16, 1942 |
| 2,286,661 | Warner | June 16, 1942 |
| 2,330,678 | Carlton | Sept. 28, 1943 |
| 2,348,323 | Binder | May 9, 1944 |

FOREIGN PATENTS

| Number | Country | Date |
|---|---|---|
| 389,930 | Great Britain | Mar. 30, 1933 |
| 522,119 | Great Britain | June 10, 1940 |